Feb. 17, 1959 F. R. McFARLAND ET AL 2,873,980
FRONT WHEEL SUSPENSION ASSEMBLY
Filed Aug. 22, 1955 5 Sheets-Sheet 1
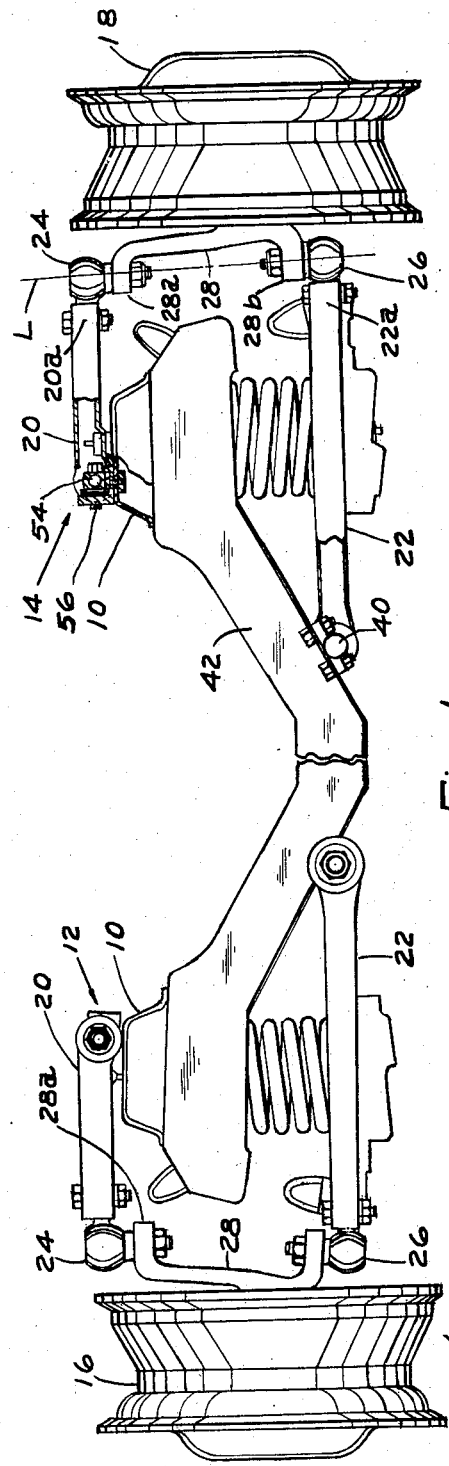
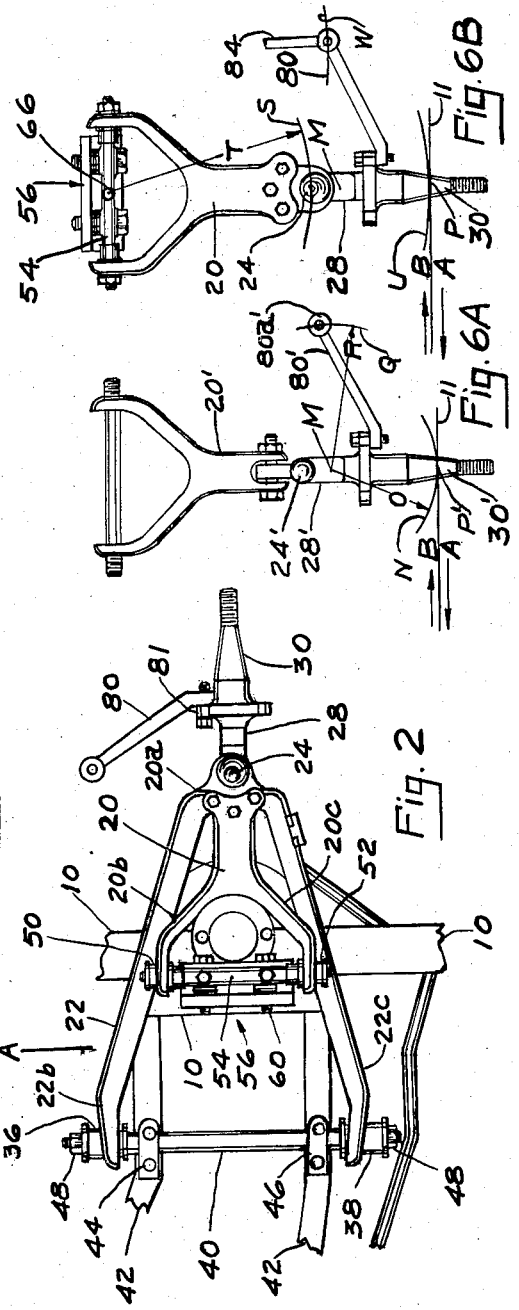
INVENTOR.
Forest R. McFarland and Paul P. Thomas
BY
Wilson Rickows Spoler

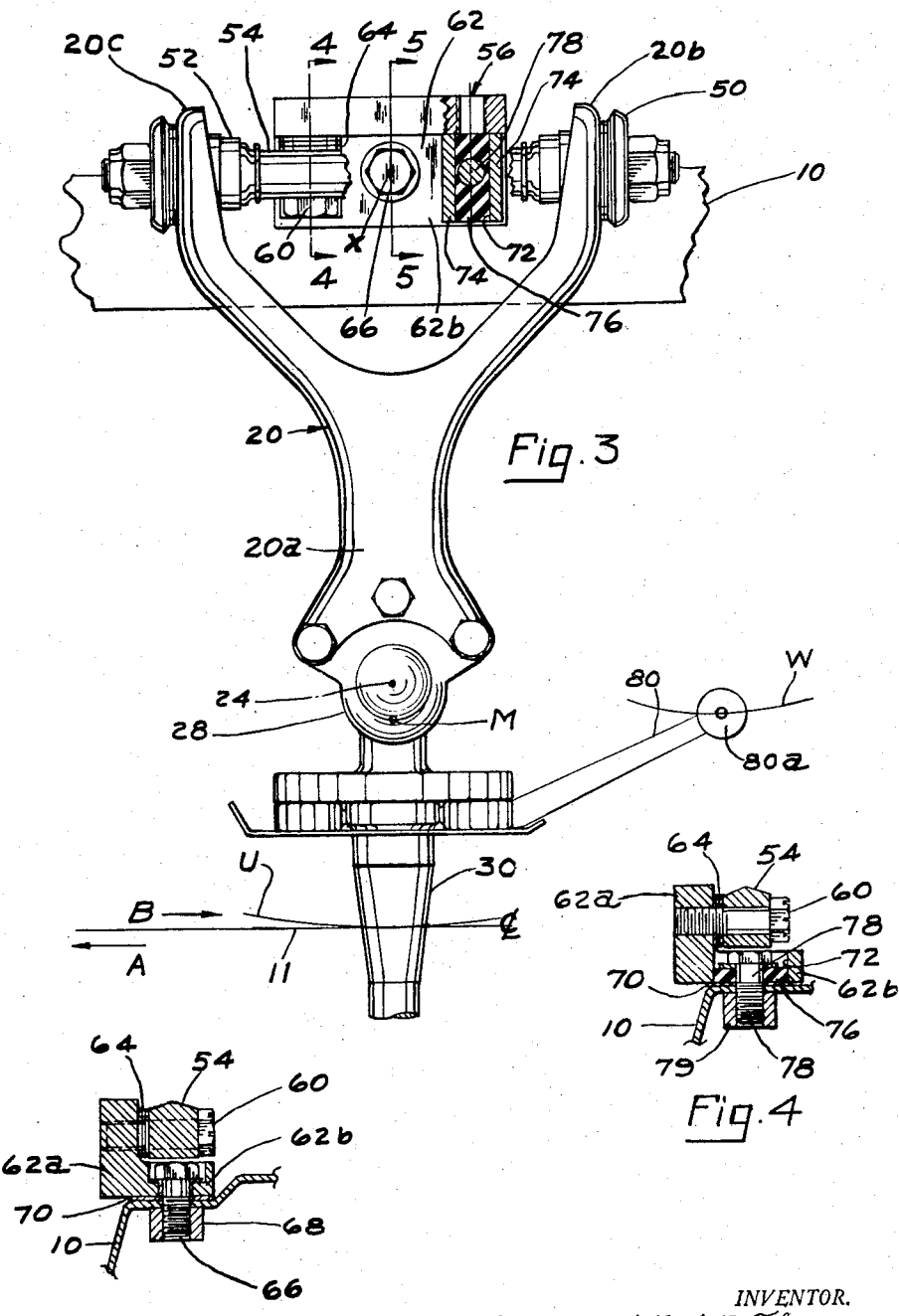

Feb. 17, 1959     F. R. McFARLAND ET AL     2,873,980
FRONT WHEEL SUSPENSION ASSEMBLY
Filed Aug. 22, 1955                            5 Sheets-Sheet 3
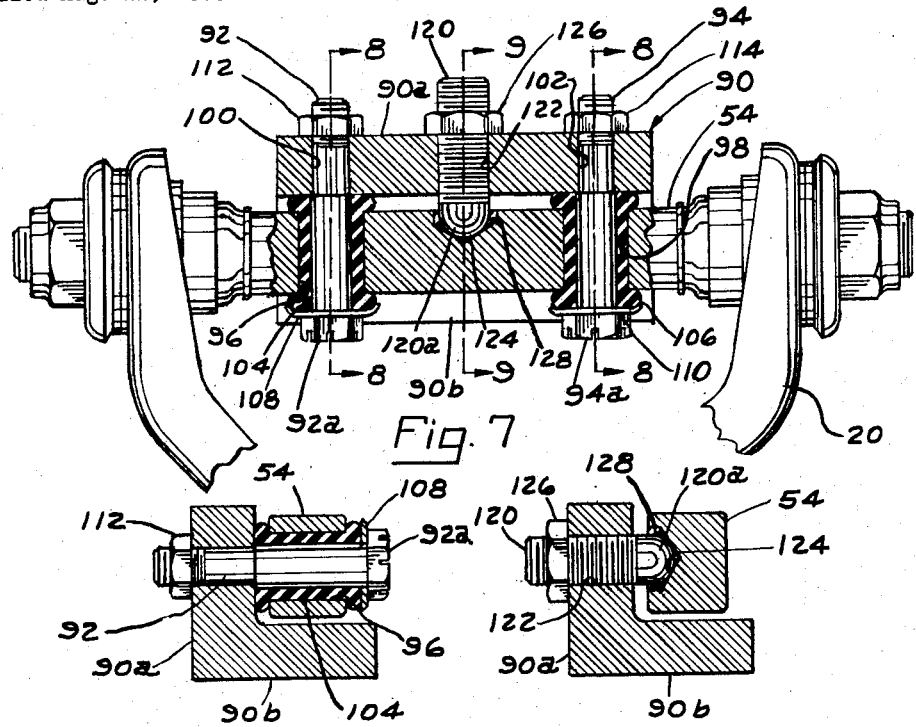
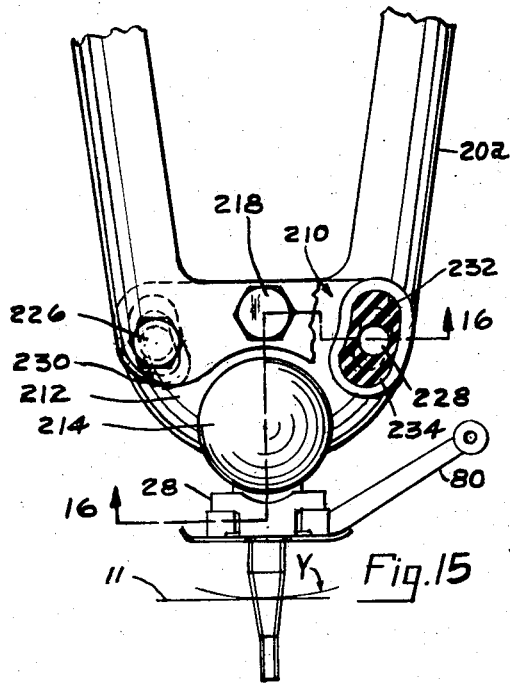
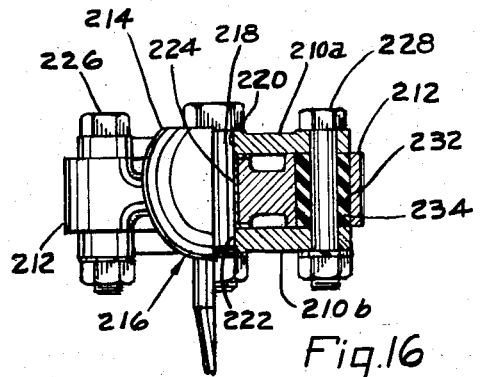
INVENTOR.
Forest R. McFarland and Paul P. Thomas
BY
Wilson Pereons Slater

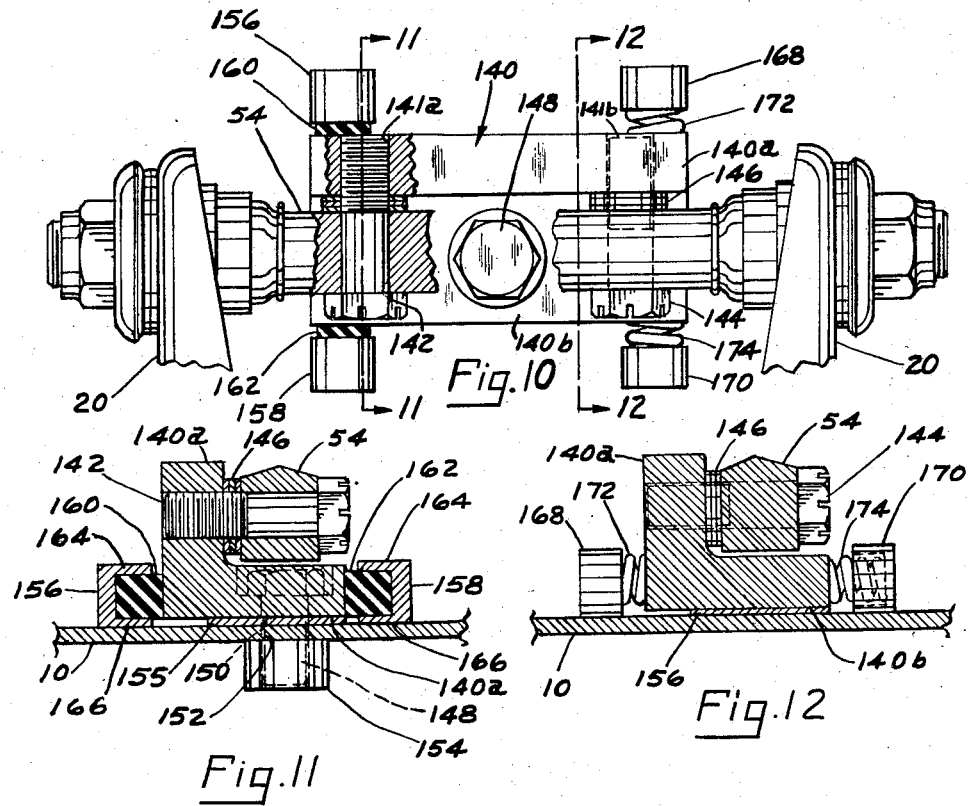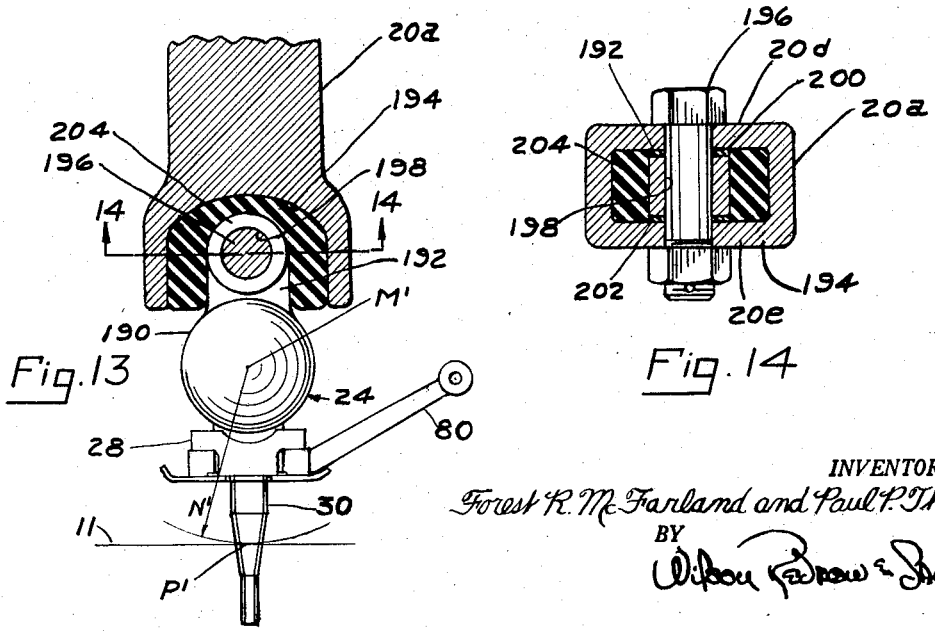

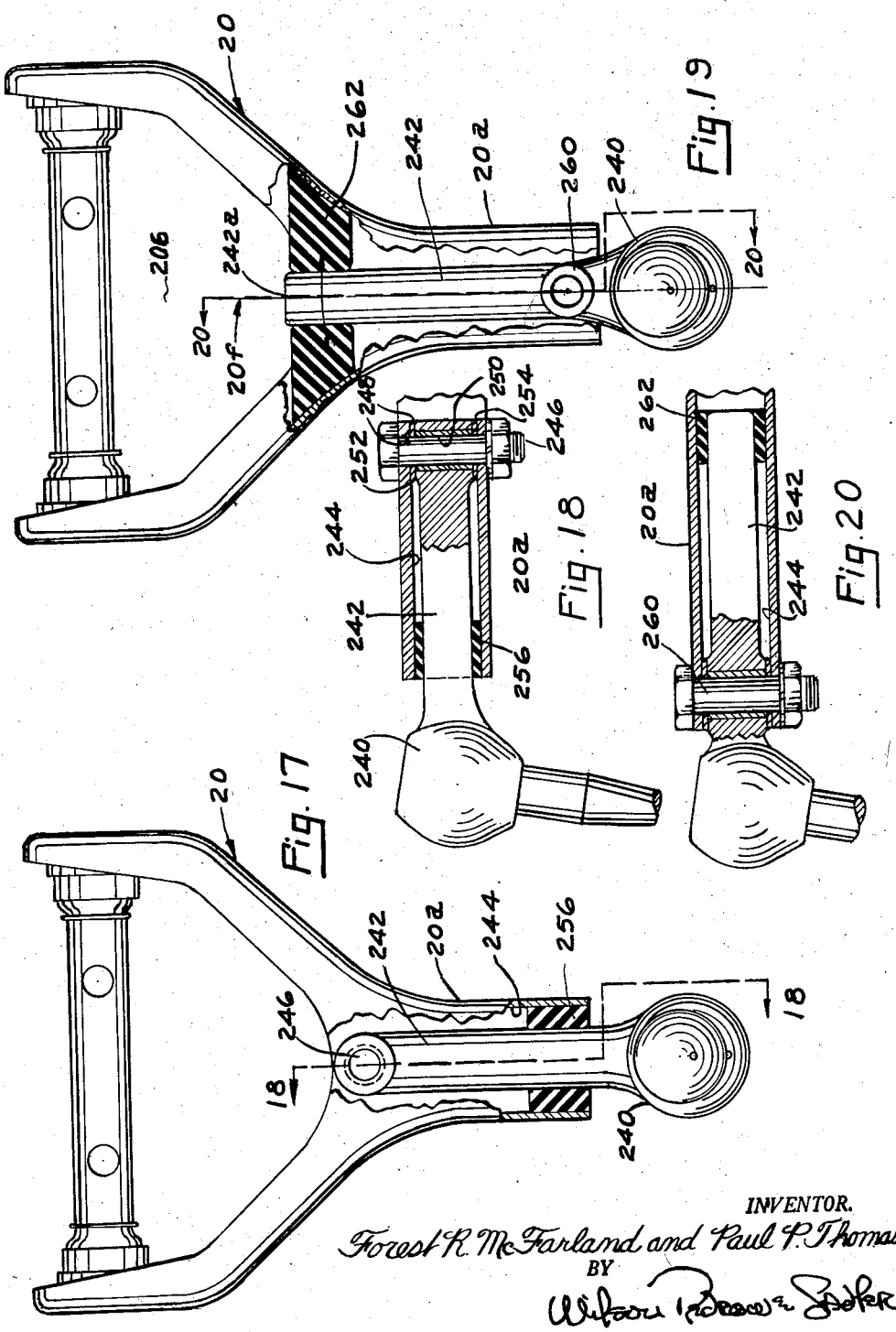

United States Patent Office 2,873,980
Patented Feb. 17, 1959

2,873,980

FRONT WHEEL SUSPENSION ASSEMBLY

Forest R. McFarland, Huntington Woods, and Paul P. Thomas, Detroit, Mich., assignors to Studebaker-Packard Corporation, Detroit, Mich., a corporation of Michigan Application August 22, 1955, Serial No. 529,845

2 Claims. (Cl. 280—96.2)

This invention relates to wheel suspension assemblies for motor vehicles for minimizing the effect of road vibration on the vehicle steering mechanism. More particularly it relates to a vehicle wheel suspension assembly including a resilient type coupling device for connecting the suspension linkage which affords the required freedom of movement between the interconnected parts and also dampens the effect of road bumps and vibration.

The increased weight of modern cars has required a shift of a larger proportion of the vehicle weight to the front wheels which in turn has necessitated various improvements in the front end suspension to improve riding characteristics as well as directional control. One such improvement is use of ball joint connections between the moving parts in the vehicle suspension and steering systems. While ball joint connections are relatively frictionless and eliminate certain alignment problems in the front wheel assembly, it has been found that vibration caused by wheel reactions to road irregularities has substantially increased. This vibration is transmitted through the ball joint suspension and imparts an undesirable movement or vibration to the steering wheel which is commonly called "wheel fight" to those skilled in the art. The increase in vibration is at least partially due to the absence of the damping action of the friction inherent in the conventional bushing type steering assembly.

To overcome these problems, the applicant has developed an improved ball joint suspension assembly utilizing a resilient type coupling device to connect the wheel supporting members to the vehicle frame. When a front wheel strikes a bump in the road, the resilient coupling permits the wheel and its associated supporting members to move a slight distance fore and aft of the vehicle. Thus, the road vibration which is normally transmitted through the suspension system to the steering mechanism, is dampened, and as a result the steering and riding characteristics of the vehicle are substantially improved.

For a further understanding of this invention, reference may be had to the accompanying drawings, in which:

Figure 1 is a front elevation of an independent front wheel suspension showing the present invention incorporated therein;

Figure 2 is a partial top plan view of one of the front wheel supporting structures shown in Figure 1;

Figure 3 is a detailed bottom plan view partially broken away, disclosing one of the upper control arms of the suspension system shown in Figure 1;

Figure 4 is a view in section taken along line 4—4 of Figure 3;

Figure 5 is a view in section taken along line 5—5 of Figure 3;

Figure 6A is a partial top plan view showing an upper control arm and supporting shaft of a conventional type front wheel suspension assembly;

Figure 6B is a partial top plan view showing an upper control arm and supporting shaft of a suspension assembly illustrative of the present invention;

Figure 7 is a top plan view partially broken away disclosing a modified form of the resilient coupling device shown in Figure 3;

Figure 8 is a view in section taken along line 8—8 of Figure 7;

Figure 9 is a view in section taken along line 9—9 of Figure 7.

Figure 10 is a top plan view partly broken away showing another modification of a resilient coupling device;

Figure 11 is a view in section taken along line 11—11 of Figure 10;

Figure 12 is a view in section taken along line 12—12 of Figure 10;

Figure 13 is a plan view showing a modification of the mounting means for steering knuckle and spindle assembly;

Figure 14 is a view taken along line 14—14 of Figure 13;

Figure 15 is a top plan view of one end of a control arm showing a modification of the mounting means for a ball joint construction;

Figure 16 is a view in section taken along line 16—16 of Figure 15;

Figure 17 is a plan view showing another modification of a ball joint construction;

Figure 18 is a view in section taken along line 18—18 of Figure 17;

Figure 19 is a plan view taken of still another modification of a ball joint mounting means; and Figure 20 is a view in section taken along line 20—20 of Figure 19.

Referring to Figs. 1 and 2, it will be seen that the main chassis or frame 10 of a motor vehicle supports independent wheel suspension assemblies 12 and 14 for front wheels 16 and 18, respectively. Each wheel suspension assembly includes a pair of upper and lower, generally V shaped control arms 20 and 22; the outer ends 20a and 22a of which are connected by ball joints 24 and 26 to the upper and lower ends 28a and 28b of a steering knuckle 28, respectively. It will be noted that the center axis L of each of the steering knuckles 28 are tilted slightly toward each other, at their upper ends 28. The knuckle 28 has a horizontally disposed spindle 30 formed integrally therewith, upon which a wheel may be rotatably mounted in a conventional manner. A conventional steering knuckle lever arm 80 is connected by suitable fastening means 81 to the knuckle assembly. For the reader's convenience, the following description refers only to the wheel suspension assembly 14, which is similar to the opposite suspension assembly 12.

As shown in Figure 2, the inwardly extending, diverging ends 22b and 22c of the lower control arm 22 are pivotally supported by rubber bushings 36 and 38 mounted on opposite ends of a horizontally disposed shaft 40, secured to the front cross member 42 of the frame 10 by bushings 44 and 46. Retaining nuts 48 screwed to the ends of the shaft 40, may be tightened to hold the bushings 36 and 38 under compression between the shaft 40 and the ends of the lower control arm. The rubber bushings 36 and 38 permit a slight fore and aft movement of the lower arm as well as a pivotal movement in a generally vertical plane. Similarly, the inwardly extending, diverging ends 20b and 20c of the upper control arm 20 are pivotally supported for generally vertical movement upon bushings 50 and 52 mounted on opposite ends of a horizontally disposed, upper shaft 54. The bushings 50 and 52 may be formed of a resilient material, such as rubber, or of other suitable materials such as nylon or metal.

The upper shaft 54 is connected to the frame 10 by a resilient coupling device indicated generally at 56, which permits a slight fore and aft movement of the upper control arm and supporting shaft 54, and the associated parts of the front wheel suspension assembly. Thus, it will be seen that each wheel suspension assembly including the upper and lower control arms 20 and 22, may be pivoted in a generally vertical plane as a single unit. In addition, the control arms may be pivoted a slight distance fore and aft of the vehicle by virtue of the rubber bushings 36 and 38 and the resilient coupling 56, subsequently to be described in detail. Also, as shown in Figure 2, the control arms 20 and 22 may be swept back from the front end of the frame for purposes well known to those skilled in the art. However, it is to be understood that the present invention is equally useful where the control arms are swept back to a lesser degree, or none at all.

Figs. 3, 4 and 5 disclose the details of one form of the resilient coupling device 56 referred to above, in which the upper control arm supporting shaft 54 of each wheel suspension assembly, is connected by bolts 60 to a vertically disposed side 62a of an angle bracket 62. Shims 64 carried by bolts 60 between the bracket 62 and shaft 54 provides suitable caster and camber adjustment for the front wheels. As is best shown in Figs. 4 and 5, a threaded bearing pin 66 and nut 68 pivotally connects the horizontally disposed side 62b of the angle bracket 62 to the frame 10, for movement in a generally horizontal plane and prevents any lateral movement of the control arm 20. A washer 70 carried by the pin 66 between the frame 10 and the bracket 62 provides a suitable bearing surface therebetween.

The horizontal side of 62b of the bracket 62 has slots 72 disposed on opposite sides of the pin 66, with steps 74 formed along the sides thereof. The slots 72 are adapted to receive rubber pads 76 which encase stop pins 78; the opposite of ends which are secured by suitable means such as nuts 79 to the frame 10. As the upper control arm 20 and supporting shaft 54 are pivoted in a horizontal plane, as for example, when the associated wheel strikes a bump in the road, the angle bracket 62 is pivoted about the bearing pin 66 and the rubber pads 76 are then compressed by the stop pins 78. Thus, a damping action is provided to limit and control the fore and aft movement of the wheel suspension assembly. Also, after the wheel passes over the bump the compressed rubber pads 76 react against the stop pins 78 to recenter the suspension assembly in its initial position in a horizontal plane.

For the purpose of more fully explaining the operations and advantages of the present invention, reference may be had to Figs. 6A and 6B. With particular reference to Fig. 6A, which discloses a conventional wheel assembly, it will be seen that point M where the spindle 30' connects with a knuckle 28', is the center of an arc N having a radius O. When the vehicle is moving in the direction of arrow A, the reaction produced when the wheel strikes a bump in the road, tends to drive the wheel rearwardly in the direction of arrow B. As a result, the knuckle 28' pivots in a ball joint 24' connected with the upper control arm 20', and point P on the spindle 30' pivots about point M as described above. At the same time the outer extremity 80a' of the steering lever arm 80' describes an arc Q about point M having a relatively short radius designated by the letter R. Thus, it will be seen that a relatively large lateral motion is imparted to the free end 80a' of the steering knuckle lever arm 80' which is due principally to the relatively short radius O of the arc N through which the knuckle and spindle are pivoted. This lateral motion of the steering lever is transmitted through the steering linkage and produces an undesirable movement in the steering wheel.

In addition, when both front wheels of the vehicle equipped with a conventional suspension system, are simultaneously driven over a railroad track at right angles, for example, the front wheels are urged rearwardly. The force causes what is commonly called "harshness in the suspension system" by those skilled in the art. This force also may be transmitted to other members of the frame structure and when severe enough, can be felt in the floor boards of the vehicle.

Next, referring to Fig. 6B (see also Fig. 3), which discloses a suspension assembly illustrative of the present invention, it will be seen that when a front wheel strikes a bump in the road, the resilient coupling 56 permits the upper control arm 20 and the associated wheel and suspension members, to move in the direction of arrow B about bearing pin 66. Thus, the outer extremity of the control arm describes an arc S having a radius T, and point P (where the center axis 11 of the associated front wheel intersects the spindle 30) tends to describe a flat arc U, extending fore and aft of the vehicle. It will be noted that arc U is substantially flatter, and therefore has a correspondingly larger radius, than the corresponding arc N and radius O in the conventional suspension arrangement shown in Fig. 6A. Also it will be appreciated that the steering lever arm 80 and knuckle assembly are constrained from pivoting about point M by the conventional steering linkage connecting therewith in a manner subsequently to be described. Thus, the lateral movement of the outer extremity 80a of the steering lever arm 80 is minimized, and the latter moves generally vertically or fore and aft of the vehicle, depending upon the specific construction of the suspension assembly. In the suspension system shown in Figure 6B, for example, the outer extremity 80a of the steering lever arm 80 moves in an arc W, extending generally fore and aft of the vehicle.

This relatively small lateral movement of the steering lever arm 80 may be absorbed or greatly limited by the proper design of the steering linkage in a manner apparent to those skilled in the art; for example, by utilizing a spring mounted ball at the end of the pitman arm which permits a limited amount of lateral movement of the linkage connecting with the steering knuckle lever arm. Further, it will be appreciated by those skilled in the art, that the effect of a vertical or a fore and aft movement of the steering lever arm 80 can be minimized far more easily than a comparatively lesser degree of lateral movement, without requiring substantial changes in the conventional steering system. This is due to the fact that the linkage commonly utilized to connect the steering lever arm with the conventional pitman arm, is supported at its opposite ends by ball joints. These ball joints in effect afford a universal movement of the connecting linkage, which in turn permits a fore and aft movement of the steering lever arm 80. The ball joints and connecting linkage, however, are subjected to compressive forces when road vibration tends to pivot the steering lever arm laterally.

After the wheel has passed over the bump, the rubber pads in the resilient coupling, which are then compressed in the manner previously described, move the control arm and the associated wheel suspension assembly back to their centralized position.

Figs. 7, 8 and 9 disclose a modification of the resilient coupling device for connecting an upper control arm of a front wheel suspension assembly to the vehicle frame. As will be seen in Figure 7, the upper control arm is pivotally supported on a horizontal shaft 54 for movement in a substantially vertical plane in a manner similar to that previously described. The shaft 54 is connected to an angle bracket 90 by bolts 92 and 94 which extend through enlarged openings 96 and 98 in the shaft 54, and through openings 100 and 102 in a vertically disposed side 90a of the bracket, respectively. Resilient bushings 104 and 106 formed of rubber or the like are fitted about the bolts 92 and 94 within the enlarged shaft openings 96 and 98. Retainer washers 108 and 110 are disposed between the heads of the bolts 92a and 94a and the bushings 104 and 106. Nuts 112 and 114 are screwed to the respective ends of the bolts 92 and 94, and when the latter are tightened, the rubber bushings 104 and 106 are compressed between the retainer washers and the side 90a of the bracket 90. The horizontally disposed side 90b of the bracket 90 may be secured to the vehicle frame in a suitable manner such as welding.

A threaded pin 120 with a rounded end 102a extends through a threaded opening 11 in the side 90a of the bracket 90, and is received within a groove or detent 124 formed near the center of the shaft 54. Lock nut 126 serves to hold the pivot pin 120 securely in the desired position. The pivot pin 120 prevents a lateral movement of the control arm 20, but still permits the latter to pivot in a horizontal plane, fore and aft of the vehicle frame. A lubricant sealing and bearing washer 128 is fitted about the rounded end 120a of the pin 120 and inserted within the detent 124.

The rubber bushings 104 and 106 permit the control arm supporting shaft to pivot a limited distance about the rounded end 102a of the threaded pin 120 in a substantially horizontal plane. The rubber bushings 104 and 106 also serve to recenter the control arm and supporting shaft after the reaction to a road bump, for example, has been dissipated.

Figs. 10, 11 and 12 disclose further modifications of the present invention in which the upper control arm supporting shaft 54 is secured to a horizontally disposed side 140a of an angle bracket 140 by means of bolts 142 and 144. Shims 146 which are carried by the bolts 142 and 144 between the shaft 54 and the bracket 140, afford suitable castor and camber adjustment of the associated front wheel suspension assembly.

The bracket 140 is pivotally mounted on frame 10 by means of a pin 148 which extends through an opening 150 in the horizontally disposed side 140b of the bracket, and through an opening 152 in the frame. The pin 148, which prevents a lateral movement of the control arm, may be secured at its free end by a nut 154 or by other suitable means such as welding. A washer 156 carried by the pin 148, provides a suitable bearing surface between the bracket 140 and the adjacent side of the frame 10.

The pivotal movement of the bracket 140 about a pin 148 may be limited in one of several ways shown in Figures 11 and 12. With specific reference to Figure 11, it will be seen that one end 141a of the bracket 140 is centered between stop members 156 and 158 by rubber pads 160 and 162, respectively. The stop members 156 and 158 may be secured by any suitable means to the frame 10, such as by welding, and have inwardly facing upper and lower flanged edges 164 and 166 adapted to receive a portion of the rubber pads 160 and 162, respectively. The pads 160 and 162 are thereby prevented from buckling when compressive forces are applied thereto. The opposite end 141b of the bracket 140 may be centered between frame mounted stop members 168 and 170 in a similar manner, or by means of opposed coil springs 172 and 174 as shown in Figure 12. It will be recognized that other resilient means apparent to one skilled in the art can be utilized in the place of the rubber pads and coil springs described above.

With either of these two latter arrangements, when the front wheel of the vehicle strikes a bump in the road, the control arm supporting shaft 54 and suspension assembly are pivoted about the pin 148, thereby compressing the rubber pads 160 and 162 (or the coil springs 172 and 174) against the frame stop members. The bracket 140 is thereafter quickly recentered with respect to the stop members, by the then compressed rubber pads or springs.

In each of the above described arrangements, the control arm is permitted to pivot in a horizontal plane about a pivotal axis located near the inner extremity of the arm. Therefore, for the reason previously described, when the wheel reacts to a bump in the road, the wheel tends to describe an arc having an elongated radius U, as shown in Figure 6B. It will be appreciated, however, that in certain types of wheel suspension assemblies, it may not be necessary to have as large a horizontal pivotal radius as in the previously described modifications. Accordingly, in the suspension assemblies next to be described, a reduced horizontal pivotal radius is utilized, which, however, is still greater than the horizontal pivotal radius used in the conventional suspension assembly shown in Figure 6A, and also the movement of the steering knuckle lever arm 80 is in a substantially longitudinal rather than a lateral plane, with respect to the vehicle frame.

With particular reference to Figures 13 and 14, the spindle and knuckle assembly (30 and 28) shown therein is similar to that shown in Figure 3, and the latter is pivotally connected to the outer extremity 20a of the upper control arm by means of a ball joint coupling 24. As previously described in connection with Figure 6A, in a conventional ball joint suspension system, the knuckle assembly would tend to pivot in a horizontal plane about axis M' where the spindle 30 connects with the knuckle assembly 28, approximately midway between the ball joints 24 and 26, and the middle portion P' of the spindle 30 would generally describe an arc having a radius indicated at N'. However, in the present arrangement, the arc of the radius N' described by the fore and aft movement of wheel assembly (at P') is increased slightly in a manner next to be described.

As will be seen in Figures 13 and 14, the ball joint coupling 24 includes a housing 190 having an inwardly facing bracket 192 formed integrally therewith. The outer end 20a of the control arm has a hollow portion or recess 194 formed therein which is adapted to receive the bracket 192. A pin 196 extends through the upper and lower sides 20d and 20e of the recess 194 in the control arm 20a, and also through a suitable opening 198 in the bracket 192. The ball joint knuckle assembly is thereby supported for pivotal movement in a substantially horizontal plane. Washers 200 and 202 which are carried by the pin 196, provide suitable bearing surface between the sides of the bracket and the adjacent supporting surface of the control arm. A resilient bushing 204 formed of rubber or other resilient material, is inserted within the recess 194 of the control arm, and surrounds the knuckle bracket 192.

When the knuckle assembly is pivoted about the pin 196, as for example, when the associated wheel strikes a bump in the road, the rubber bushing 204 is compressed by the bracket 192, thereby limiting the movement of the latter similar to the previous modifications, the rubber bushing 204 also serves to recenter the wheel assembly in its normal position, after the wheel has passed over the bump. It will also be appreciated that in the above modification the pivotal radius of the arc Y can be increased or decreased as desired, by the obvious expedient of utilizing a shorter or longer knuckle supporting ball joint bracket.

Figures 15 and 16 disclose a modification of the structure shown in Figures 13 and 14. As will be seen in Figure 15, the outer end of the control arm 20a has formed integrally therewith an adapter member 210 having horizontal spaced apart walls 210a and 210b. The walls 210a and 210b of the member 210 are adapted to receive a supporting bracket 212 formed integrally with the housing 214 for knuckle supporting ball joint 216. A pin 218 extends through suitable openings 220 and 222 in the adapter member walls 210a and 210b, and also in the bracket 212, and the bracket and connected knuckle assembly are thereby supported for horizontal pivotal movement. Stop pins 226 and 228 also extend through the adapter member walls 210a and 210b, and through elongated slots 230 and 232 in the knuckle bracket 212, on the opposite sides of the pivot pin 218, respectively. The bracket slots 230 and 232 are adapted to receive compressible rubber bushings 234 which surround the respective stop pins 226 and 228.

In the above arrangement when the wheel of the vehicle (and the associated spindle and knuckle assembly) strikes a bump in the road, it is pivoted rearwardly through a flat arc Y. The rubber bushings 234 are thereby compressed, and serve to dampen the movement of the wheel. Also, as in the previous modifications, the then compressed rubber bushing acts to recenter the wheel after it has passed over the bump.

Figures 17 through 20 disclose further modifications of the present invention, which are generally similar to the ball joint arrangements disclosed in Figures 13 through 16. As will be seen in Figures 17 and 18, the housing 240 for the knuckle supporting ball joint has an arm 242 formed integrally with the inner side thereof. The arm 242 is received within a hollow cylindrical portion 244 in the outer extremity 20a of the upper control arm 20. The free end of the arm 242 is pivotally supported by a pin 246 which extends through openings 248 and 250 in the control arm and the arms 20 and 242, respectively. Washers 252 and 254 which are carried by the pin 246 provide suitable bearing surfaces of the control arm.

A compressible rubber bushing 256 is inserted in the cylindrical opening 244 of the control arm and surrounds a portion of arm 242, near the ball joint housing 240. By this arrangement, the steering knuckle assembly is permitted to pivot about pin 246 when the wheel supported thereby strikes a bump in the road, and the pivotal movement of the arm 242 (and the associated wheel) is dampened by the compressed rubber bushing 256. It will be appreciated that the horizontal pivotal radius of the knuckle assembly and arm 242 may be increased or shortened by varying the position of the pivotal pin 246 in an obvious manner.

Figures 19 and 20 disclose a modification similar to that shown in Figures 17 and 18, but with the arm 242 pivotally supported at the outer extremity of the control arm, by pin 260. The free end 242a of the arm 242 is centered with respect to the longitudinal axis of the control arm as indicated at 20f by means of an annular rubber bushing 262 which is fitted about the free end 242a of the arm 242 inserted within the hollow opening 244 in the outer end 20a of the control arm 20. In this latter arrangement it will be seen that the horizontal pivotal radius is somewhat less than that shown in Figure 17, by virtue of the fact that pivotal pin 260' is disposed near the outer extremity of the control arm.

It will be appreciated that the wheel suspension arrangement shown in Figures 15 and 16, 17 and 18, 19 and 20, the horizontal pivotal radius of the wheel supporting assembly is substantially greater than in the conventional arrangement shown in Figure 6A. As a result, a relatively small lateral motion is imparted to the steering knuckle lever arm 80, and as in the first described modifications (Figures 1-12) the lever arm 80 is moved substantially in a longitudinal plane with respect to the vehicle.

It is to be understood that the terminology employed in the above specification is for the purpose of description and not of limitation, and the various modifications described above are subject to obvious variations apparent to those skilled in the art. For example, the pivotal mounting arrangement of the control arm has been described above principally in connection with the upper control arm, and it will be recognized that the lower control arm may be mounted in a similar manner, if desired. In addition, it will be recognized that other means may be utilized to provide a limited horizontal pivotal movement of the control arm, and a separate independent means may be used to recenter the control arm in its normal position after the associated wheel strikes a bump in the road. Accordingly, it is to be understood that the following claims are not to be considered as limited to the details of construction or arrangement of parts illustrated and described in the specification, since the invention is capable of other embodiments and may be practiced and carried out in various ways.

We claim:

1. A front wheel suspension assembly supported by a vehicle frame including a control arm and a steering knuckle and spindle assembly pivotally mounted by ball joint means at one end of said control arm for pivotal movement in a substantially horizontal plane, comprising a horizontally disposed shaft for pivotally supporting the opposite end of the control arm for pivotal movement in a substantially vertical plane, an angle bracket pivotally mounted on said frame for movement in a substantially horizontal plane, means for connecting the horizontal shaft to said angle bracket, at least one compressible resilient element adapted to be mounted within a corresponding opening in said bracket, and at least one stop member fixedly mounted with respect to the frame and connecting with said resilient element, whereby said control arm and steering knuckle and spindle assembly are moved a limited distance fore and aft of the frame, in a flat arc, when the associated wheel strikes an uneven surface in the road; said resilient element then being compressed by the stop member, and the former thereafter serving to recenter the control arm and knuckle assembly in their initial position in a horizontal plane.

2. A front wheel suspension assembly supported by a vehicle frame including a control arm and a steering knuckle and spindle assembly pivotally mounted by ball joint means at one end of said control arm for pivotal movement in a substantially horizontal plane, comprising a horizontally disposed shaft for pivotally supporting the opposite end of the control arm for pivotal movement in a substantially vertical plane, an angle bracket, pivot pin means for pivotally mounting the angle bracket on said frame for movement in a substantially horizontal plane, means for connecting the horizontal shaft to said angle bracket, at least one compressible resilient element adapted to be mounted within a corresponding opening in said bracket, and at least one stop member fixedly mounted with respect to the frame and connecting with said resilient element, whereby said control arm and steering knuckle and spindle assembly are moved a limited distance about said pivot pin means fore and aft of the frame, in a flat arc, when the associated wheel strikes an uneven surface in the road; said resilient element then being compressed by the stop member, and the former thereafter serving to recenter the control arm and knuckle assembly in their initial position in a horizontal plane.

References Cited in the file of this patent

UNITED STATES PATENTS

| | | |
|---|---|---|
| 2,177,934 | Britton et al. | Oct. 31, 1939 |
| 2,216,959 | Paton | Oct. 8, 1940 |
| 2,226,406 | Krotz | Dec. 24, 1940 |
| 2,305,795 | Schieferstein | Dec. 22, 1942 |
| 2,305,802 | Balz | Dec. 22, 1942 |
| 2,556,767 | McCann | June 12, 1951 |